United States Patent
Latzina et al.

(10) Patent No.: US 8,700,389 B2
(45) Date of Patent: Apr. 15, 2014

(54) SYSTEMS AND METHODS FOR MODEL-BASED PROCESSING OF LINGUISTIC USER INPUTS USING ANNOTATIONS

(75) Inventors: Markus Latzina, Wiesenbach (DE); Joerg Beringer, Los Altos, CA (US)

(73) Assignee: SAP AG, Walldorf (DE)

( * ) Notice: Subject to any disclaimer, the term of this patent is extended or adjusted under 35 U.S.C. 154(b) by 693 days.

(21) Appl. No.: 12/977,670

(22) Filed: Dec. 23, 2010

(65) Prior Publication Data
US 2012/0166178 A1      Jun. 28, 2012

(51) Int. Cl.
*G06F 17/27* (2006.01)

(52) U.S. Cl.
USPC .......................................................... 704/209

(58) Field of Classification Search
USPC .............................. 704/1, 9, 10; 707/759, 760
See application file for complete search history.

(56) References Cited

U.S. PATENT DOCUMENTS

| | | | |
|---|---|---|---|
| 7,565,294 B2* | 7/2009 | Rhoads | 704/270 |
| 8,121,618 B2* | 2/2012 | Rhoads et al. | 455/456.1 |
| 8,332,478 B2* | 12/2012 | Levy et al. | 709/217 |
| 8,489,598 B2* | 7/2013 | Rhoads et al. | 707/736 |
| 2002/0033844 A1* | 3/2002 | Levy et al. | 345/744 |
| 2003/0158796 A1* | 8/2003 | Balent | 705/28 |
| 2005/0060220 A1* | 3/2005 | Beringer | 705/10 |
| 2009/0132667 A1* | 5/2009 | Jung et al. | 709/206 |
| 2011/0264697 A1* | 10/2011 | Latzina et al. | 707/771 |
| 2013/0006967 A1* | 1/2013 | Beringer et al. | 707/722 |

* cited by examiner

*Primary Examiner* — Michael N Opsasnick

(74) *Attorney, Agent, or Firm* — Fountainhead Law Group PC

(57) ABSTRACT

The present invention includes model-based processing of linguistic user inputs. In one embodiment, the present invention includes a computer-implemented method comprising receiving linguistic inputs, parsing the linguistic inputs, mapping the linguistic inputs to a formal representation used by a model, applying the formal representation against the model, where the model comprises said formal representation, and where the model specifies relationships between the elements of the formal representation and defines process information, and accessing software resources based on the formal representation of the user input and the relationships and process information in said model.

17 Claims, 4 Drawing Sheets

SYSTEMS AND METHODS FOR MODEL-BASED PROCESSING OF LINGUISTIC USER INPUTS USING ANNOTATIONS

BACKGROUND

The present invention relates to computing, and in particular, to a systems and methods for accessing applications based on user intent.

Unless otherwise indicated herein, the approaches described in this section are not prior art to the claims in this application and are not admitted to be prior art by inclusion in this section.

Computer applications have become ubiquitous in the work and private lives of users. Computer applications running on computer systems from servers to personal computers to personal digital assistants and cell phones permeate our lives. Typically, users load different computer software applications onto their computing devices based on their own personal needs and preferences. For example, a user of a work computer may use an Enterprise Resource Planning ("ERP") software application, a communications and calendaring software application (e.g., Microsoft® Outlook®), and other work specific applications, whereas a home user may use a photo or video editing software application and other applications targeting hobbies and entertainment. Users typically perform a variety of tasks using software services available in the particular environment.

The goals and desires of a user when using software (i.e., the user intent) is typically expressed by the particular applications or services a user accesses manually (e.g., via mouse clicks). While automated service-discovery and a loose-coupling of software components has occurred, the navigation and the expressiveness of user interfaces of business applications, for example, is still limited to navigating between landing pages (e.g., role-based) and packaged UI (ERP transactions or office applications). Currently, the information architecture of traditional computer software systems is described by navigational links between pre-packaged software and screens, and the system has limited or no understanding of the user intent and the purpose of particular services. A conversation with the user and the system on how to achieve a goal is currently limited to proprietary and local applications (e.g. problem resolution wizards, map directions, domain-specific tools such as trip booking). But at the application level, such knowledge is currently not represented efficiently, and thus cannot support the user in choosing between multiple methods and services for accomplishing an action. For example ToDos in office products describe the task (due date, owner, status) but do not recommend the implementation of the action to accomplish the task.

One common approach for interacting with a user is the graphical user interface (GUI). GUIs allow users to interact with a software application (e.g., in the business or enterprise context) using graphical constructs such as icons, windows, etc. However, GUIs suffer from a number of issues. For example, in terms of information architecture, GUIs need to provide means for spatially structuring the content of the application on the screen in order to let the user access the desired service or function. For instance, some GUIs may employ a tree in order to navigate a hierarchical structure. This can cause issues if the user does not identify the appropriate branch under which the sought item was sorted in. Additionally, in terms of interaction design, GUIs need to provide highly specific means for using a specific function. For example, the user may need to click on a specific button which is located at a particular screen location in order to activate the corresponding function. This can cause issues if the user has difficulties in identifying the button or clicking it. Moreover, in terms of interface text terminology, GUIs may suffer from unfamiliar text identifiers. For example, when text associated with a GUI interface features a label which is unfamiliar to the user, the user may mistakenly assume that the function is not the desired function. This could be the case when the interface states "save" but the user expects the label "submit" to finalize and provide their input for subsequent processing.

In some GUIs there can be numerous mismatches between the user intent and how the user interface enables users to realize the intent. In principle, if there is a mismatch, the full load for resolving an issue is on the user since the GUI is relatively rigid and cannot adapt spontaneously to the stated user intent. Even if the GUI was set up to adapt to user input, this kind of adaptation mostly applies only to syntactical user interactions (e.g., user operations which pertain to the physical features of the GUI) but does not reflect the user intent which is semantic in principle.

The present disclosure addresses these and other issues with systems and methods for model-based processing of linguistic user inputs.

SUMMARY

Embodiments of the present invention include systems and methods for model-based processing of linguistic user inputs. In one embodiment, the present invention includes a computer-implemented method comprising receiving, on a computer system, an input from a user, the input comprising one or more linguistic inputs, parsing the one or more linguistic inputs on the computer system, mapping, on the computer system, the one or more linguistic inputs to a formal representation used by a model, storing information in a datastore on the computer system, the information corresponding to a plurality of software resources, wherein the plurality of software resources have associated annotations, the annotations comprising first elements of the formal representation used by the model, applying, on the computer system, the formal representation of the linguistic inputs against the model, wherein the model specifies relationships between elements of the formal representation and defines process information, and accessing software resources on the computer system based on the formal representation of the linguistic inputs, the relationships and process information in said model, and the annotations.

In one embodiment, the formal representation comprising actors, activities, and objects, wherein the one or more linguistic inputs are mapped to a first actor, a first activity, and a first object.

In one embodiment, the model comprises a plurality of actors including the first actor, a plurality of activities including the first activity, and a plurality of objects including the first object, wherein the model specifies relationships between the actors, activities, and objects and defines process information for executing the first activity.

In one embodiment, the method further comprises determining that the one or more linguistic inputs do not include at least one of the first actor, the first activity, or the first object, the method further comprising invoking a resolution dialog to obtain first actor, first activity, or first object not included in said one or more linguistic inputs.

In one embodiment, mapping comprises accessing an electronic dictionary, wherein the dictionary maps one of said linguistic inputs to said first actor, said first activity, or said first object.

In one embodiment, the annotations comprise an actor, an activity, and an object.

In one embodiment, the model is implemented in declarative programming language statements.

In one embodiment, the present invention includes a non-transitory computer readable storage medium embodying a computer program for performing the processes and method described herein.

In one embodiment, the present invention includes a system, such as a computer system, configured with software for performing the processes and methods herein.

The following detailed description and accompanying drawings provide a better understanding of the nature and advantages of the present invention.

DETAILED DESCRIPTION

Described herein are techniques for model-based processing of user inputs. The apparatuses, methods, and techniques described below may be implemented as a computer program (software) executing on one or more computers. The computer program may further be stored on a non-transitory computer readable medium. The computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Embodiments of the present invention include a model-base linguistic user interface (MLUI) which provides remedies to the typical types of issues users are facing when interacting with a graphical user interface (GUI). In one embodiment, users express their task-related intent by linguistic means (e.g., words), and the system may infer from user statements the services and/or functions which correspond to the user's intent. The system may offer one or more respective services and/or functions to users for actual use.

Figure 1:
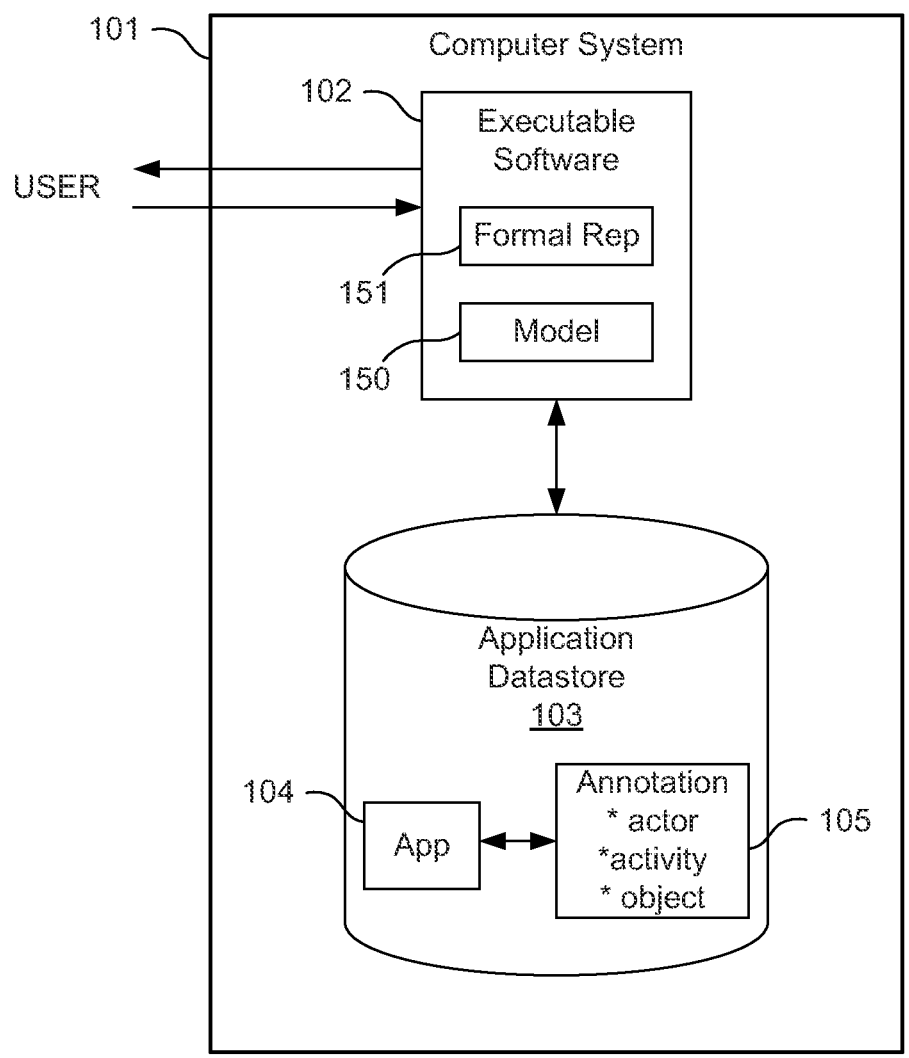
FIG. 1 shows a computer system for model-based processing of user inputs according to one embodiment.

FIG. 1 shows a computer system for model-based processing of user inputs according to one embodiment. Computer system 101 may include one computer or multiple computers with different software components operating on different computers. The computers may be portable computing systems (e.g., cell phones or personal digital assistants), tablet computers, laptop computers, desktop computers, or server computers, for example. Computer system 101 includes executable software 102 that performs the processes described herein. Executable software 102 may interface with a user by receiving user inputs (e.g., from a mouse, keyboard, or touch screen) and sending outputs (e.g., to a display).

Figure 2:
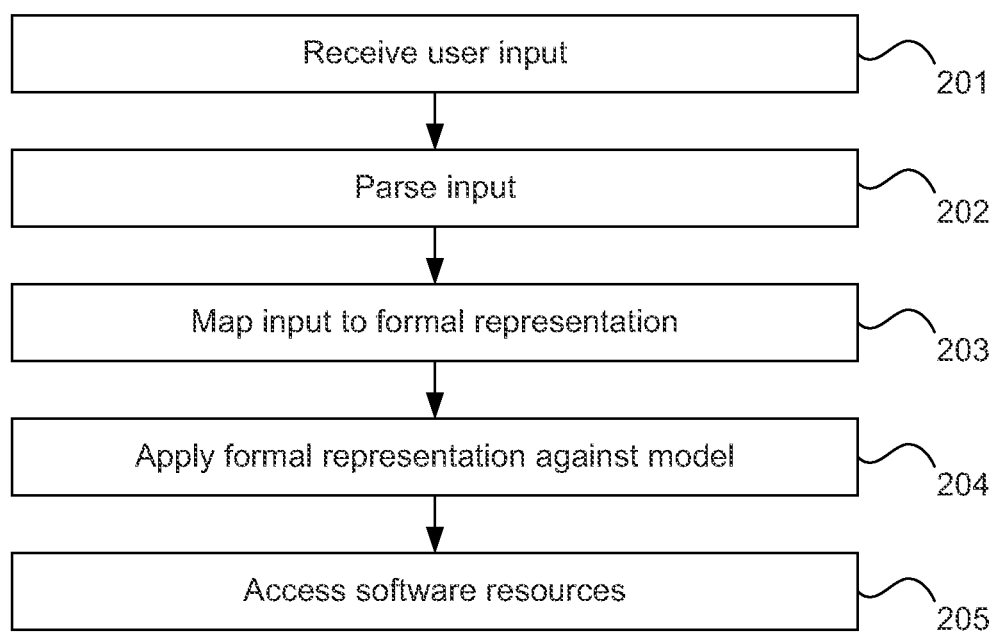
FIG. 2 shows a method of model-based processing of user inputs according to one embodiment.

Computer system 101 includes executable software 102 and an application datastore 103. The operation of executable software 102 will be described with reference to FIG. 2, which shows a method of model-based processing of user inputs according to one embodiment. Executable software 102 receives inputs from a user at 201. An input may comprise one or more linguistic inputs (e.g., words). At 202, the linguistic inputs are parsed. Embodiments of the present invention include a model 150 and a formal representation 151. Model 150 may specify relationships between elements of the formal representation and define process information. For example, in one embodiment, the elements of model 150 are actors, activities (i.e., actions), and objects. Model 150 may specify relationships between the actors, activities, and objects in the model. As a particular example, the model may include the following:

Actors: User1, User2
Activity: Approval
Object: Expense Report

The model may specify that actors User1 and User2 are related in a "manager-subordinate" relationship. Additionally, the model may define a process that expense reports require approval (e.g., "approve(expense_report)"). Further, a model may specify a relationship between a manager and approval (e.g., manager(approves(expense_report)) or approve(manager, expense_report)).

The above examples illustrate that model 150 is operative on a formal representation of information. Accordingly, the linguistic inputs received from the user are mapped to formal representation 151 used by model 150. A formal representation refers to the particular structure and context of particular elements (e.g., semantics). The linguistic inputs mentioned above are mapped at 203 to a formal representation 151 used by model 150 so the model can be used with the inputs to achieve a result. It is to be understood that a variety of formal representations may be used.

As mentioned above, in one example formal representation, the elements may include actors, activities, and objects. Accordingly, the linguistic inputs received from the user may be mapped to a first actor, a first activity, and a first object. For example, a user may provide the following input:

"Buy an iPad".

The words may be parsed and then mapped to a formal representation including an actor, activity, and object. In this case, the actor is the user, the activity is "buy", and the object is "iPad". The mapped input may be expressed in a formal representation as follows:

"buy(userID, iPad)"

Where "userID" is an identification (e.g., a number or code) of the user providing the input, for example. As another example, a user may enter "I want to purchase an iPad." This input may be parsed and mapped to the same formal representation set forth above, for example.

Referring again to FIG. 2, at 204 the formal representation of the linguistic inputs from the user may be applied against model 150. Model 150 specifies relationships between the elements of the formal representation and defines process information, for example, for performing steps of a process (e.g., a business process). Using the example above, the formal representation used by the model includes actors, activities, and objects. Therefore, model 150 may include a plurality of actors, a plurality of activities, and a plurality of objects. The actors, activities, and objects of model 150 include the actor, activity, and object to which the input words were mapped (e.g., userID, buy, iPad above). Additionally, model 150 may specify relationships between the actors, activities, and objects and define process information for executing the first activity. As mentioned above, if an input word is mapped to User1, then model 150 may indicate that User1 is a subordinate to a manager, User2, for example. Additionally, as also mentioned above, model 150 may define a process where purchases must be approved by a manager, where purchase is the activity, User2 is the actor, and an iPad is the object, for example.

Embodiments of the present invention include storing information in a datastore 103 that supports access to computer resources (e.g., applications) by software 102. Datastore 103 may be referred to as an "Appstore", for example. It is to be understood that datastore 103 may store the applications themselves or information for accessing the applications, such as a link, for example.

FIG. 1 illustrates an application 104 in datastore 103. Embodiments of the present invention include software resources (e.g., applications) having associated annotations that support access to such resources in response to linguistic user inputs. The annotations may be metadata associated with the applications, for example. Application 104 has associated annotation 105. Annotation 105 includes elements of formal representation 151, for example, so the annotations are interoperable with model 150. In this example, annotation 105 includes one or more actors, activities, and/or objects.

Features and advantages of the present invention further include accessing software resources on a computer system based on the formal representation of the user input, the relationships and process information in model 150, and the annotations. This step is illustrated at 205 in FIG. 2. For instance, applications in datastore 103 may be accessed based on the words entered by a user and the relationships and processes associated with the formal representations corresponding to the input words. Additionally, applications may be accesses based on the annotations specified in the formal representation. Referring to the example above, a user may express an interested in buying an iPad by entering words. However, a model may indicate that manager approval is required. Accordingly, software 102 may access a software resource for processing such approval. Approval software (e.g., a purchasing approval service) may include an annotation with an activity field "purchasing." More specific approval processing software may further include a "subordinate" actor field (e.g., if the application is tailored for use by subordinates), and a "computer resource" object field (e.g., if the application is tailored for obtaining approval of computer resources). Accordingly, software 102 may use model 150 and select one or more particular applications based on the words provided by a user, the relationships and process information in the model, and the annotations.

Figure 3:
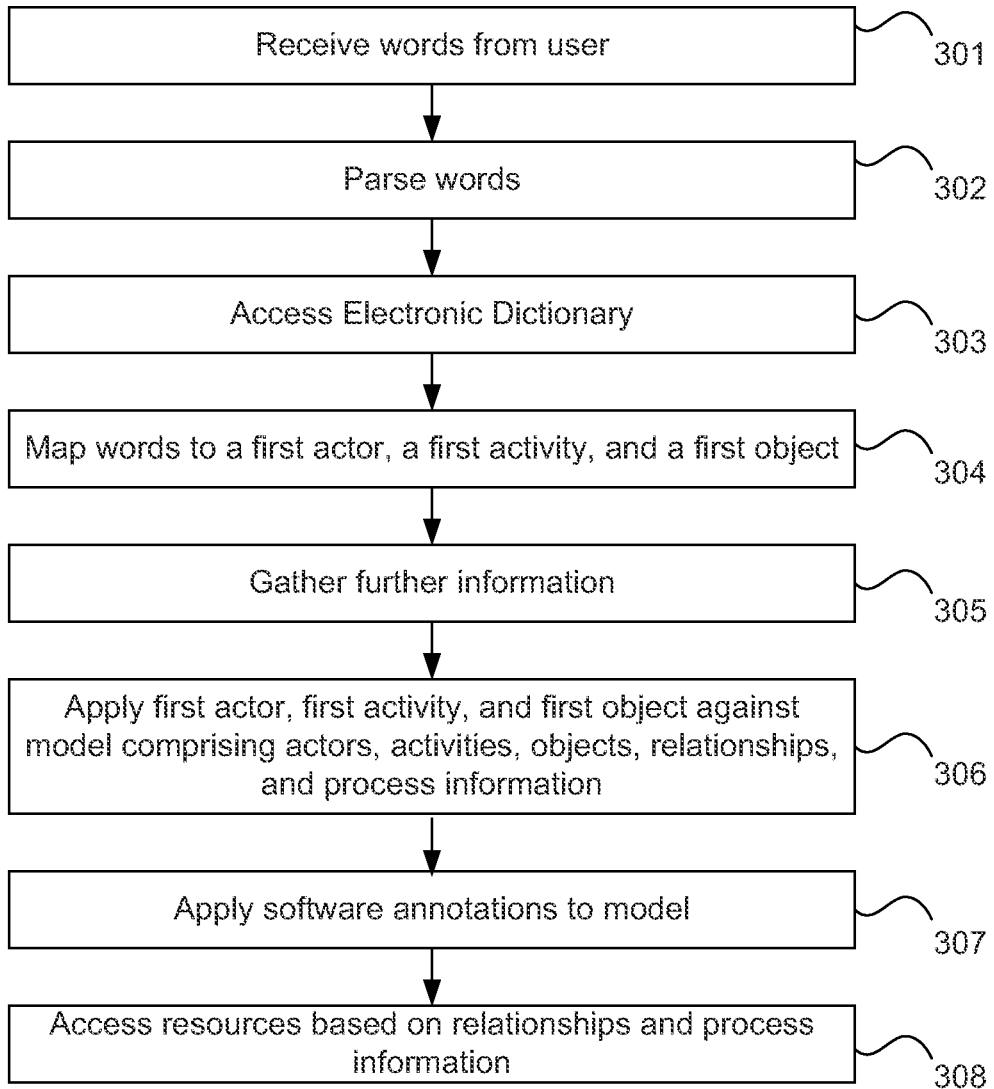
FIG. 3 shows a specific example of model-based processing of user inputs according to one embodiment.

FIG. 3 shows a specific example of model-based processing of user inputs according to one embodiment. In this example, words are received from a user at 301. The words are parsed at 302. At 303, an electronic dictionary is accessed. The electronic dictionary may map one or more user input words to actors, activities, or objects in the formal representation. For example, if a user enters "I want to buy a smart phone," then the system may parse the input and access the electronic dictionary to find alternative representations for certain words that map to the formal representation. In this example, the formal representation may include an activity "purchase." Accordingly, the electronic dictionary may include "purchase=buy." Thus, the input word "buy" may be substituted with "purchase," which is consistent with the formal representation. Additionally, the dictionary may include supplemental terms for "smart phone" such as "iPhone" and "Droid". Therefore, "smart phone" may be supplemented and/or substituted with "iPhone" and "Droid". Next, at 304, the words are mapped to a first actor, a first activity, and a first object. This step may produce the following: actor: userID, activity: purchase; object: {smart phone, iPhone, Droid}.

In this example, at 305, the system may gather further information about the user's intent. For example, the system may determine that one or more words input by the user do not include an element of the formal representation, such as an actor, activity, or object. As a specific example, the user may input "purchase" but no other information. In this case, the system has an actor (i.e., the user) and an activity (i.e., purchase), but no object. The system may determine that the "object" element of the formal representation is missing and invoke a resolution dialog. A resolution dialog may be used to elicit missing information from a user, for example. The software may include a flag (e.g., a variable, parameter, or field) indicating the particular element of the formal representation that is missing (or equivalently, a flag indicating the elements that are not missing). Accordingly, the software may output one or more prompts to the user to gather the missing information. In this case, the software may display a prompt "What would you like to purchase." In some example implementations, a resolution dialog may be triggered if a degree of certainty concerning a fit between a stated user intent and available services and/or functions (in the repository) does not surpass a certain threshold, for example. Additionally, the system may display dynamically created rephrases for disambiguating the user intent as it was stated initially by the user. For example, the system may prompt users to acknowledge any of the system-provided statements which are indicative of possible user intent. It is to be understood that a variety of user interactions may be generated depending on the type of information be gathered.

At 306, the first actor, first activity, and first object derived from the user input are applied against the actors, activities, objects, relationships, and process information of the model. Additionally, at 307, software annotations may be applied against the model. At 308, software resources may be accessed based on the first actor, first activity, and first object, the actors, activities, objects, relationships, and process information in the model, and the annotations.

As mentioned above, features and advantages of the present invention may include gathering further information about user intent after receiving the user's linguistic input. As another example, the user may input "I want to plan a trip." In this case, the word "I" is used to access a userID, and the userID is mapped to "actor" (actor: userID). Similarly, the words "want to plan" are mapped to a particular "activity" "planning" (activity: planning). Finally, the words "a trip" are mapped to an "object" (or resource) (object: trip). Accordingly, the user's statement is converted into a formal representation which can be processed computationally. Software 102 may include an inference component (e.g., an inference engine) that processes the formal representation and infers that the value "trip" for the "object" requires further specification by the user. The system may include a natural language generator component to respond with, "What is your trip destination?" The user may respond, "Austin, Tex." The system may assume that the user will be departing from a particular pre-stored default office address and that a flight connection from the nearest airport should be chosen. The system may then inquire, "Are you travelling from Frankfurt Airport in Germany to Austin, Tex.?" The user may provide a confirmation by responding, "Yes." Next, the system may provide a selection of software services for completing the trip planning. The system may include a recommendation software component for making recommendations of available services that meet the user's intent as determined from the user's input statement, the model, and the annotations, for example. In some implementations, the goal may not be to solve the user task incrementally in the course of a user-system-dialogue. Rather, in particular implementations, the system may acquire only as much information which is necessary to suggest a suitable ("maximally fitting" or "optimal") service or function. For example, the system could suggest a service that is designed for planning international trips and that can contain any of the instance values which the user may have previously entered as prefilled form field values.

Example Implementations

Embodiments of the present invention apply a model-based linguistic user interface (MLUI) to address the needs of users in a business or enterprise domain. Typically, the needs of these users arise from the tasks which they are expected to perform as part of their work in a particular business domain or context. In order to accomplish a particular task users typically must (cognitively) form a task-related intent and seek appropriate means how they can interactively express and realize this task-intent with the help of the software appliance using UI features. As far as GUIs are concerned, a mismatch between a user intent and UI features is hard to overcome and GUIs can hardly adapt to user intents. The reason for this type of issue is that the GUI in principle comprises physical features while the user intent refers to semantic entities. Therefore, example embodiments of the present invention provide an MLUI which uses a semantic model of user tasks for mediating the interaction between users and software appliances, and more specifically, between user intents and behavior of the MLUI.

Particular embodiments may be suited for any kind of scenario where users need to perform tasks and where they need to express their task-related intent in order to accomplish a particular task with the help of services and/or functions (i.e., software resources). The model-based linguistic user interface described herein may be suited for services and/or functions in the domain of business or enterprise software where the underlying model of the interaction between user and software is informed by the semantics of a business domain or context. A business domain may be depicted in terms of the business scenarios, business processes, and respective subparts (e.g., steps, subprocesses). Such processes may be represented in a model as described above, for example. The business domain may also include assumptions about user roles or resources which are meant to participate in it. This information pertaining to business domains may be considered as the "semantic" aspect of some embodiments of the model described herein because it can be linked to task-related aspects. Some information concerning business domains which is not included in the model can be treated as mere "background" information. In some implementations, the underlying model for the MLUI reflects both task-related and (business) domain-related aspects. Thus, the model may be implemented as a (business) semantic task-domain model.

In one embodiment, a software application running an MLUI accepts linguistic user expressions, for example, in the form of natural language or pseudo-natural language statements. The application semantically interprets them in light of the underlying model. The MLUI application interprets a user statement as the expression of a task-related intent. The application allows users to accomplish the actual task intent using one or more software resources—e.g., service(s) and/or function(s). Based on the user input, model elements, and annotations associated with each software resource, the application identifies optional software resources (e.g., services and/or functions) for accomplishing a particular user intent, and provides the user with corresponding choices for making a final selection of a single or multiple software resources for actual use. In the case of multiple services and/or functions, the application may suggest a specific sequence in which the user may want to interact with the recommended resource set. Also, some recommended services and/or functions may be annotated with aspects of priority (e.g., indicating that some are estimated to be mandatory for the completion of the stated user intent while others are merely optional).

In some embodiments, written text or speech is the primary input and output media. However, this does not exclude an implementation by means of a GUI and physical input devices (e.g., keyboard or mouse). For example, users may express their intent linguistically by composing statements by selecting appropriate phrases or phrase elements in the form of visual symbols from the screen, which could be offered in text boxes or as text tags to be composed into a single user statement. Some embodiments of the present invention may include a combination of MLUI and GUI. For example, a user may initially trigger a system response by making a linguistic input in the form of a written statement (text as input). In response, the user may receive a graphic representation of the corresponding service and/or function, which the user may subsequently choose to interact with (in order to satisfy their initial task-related intent).

In general, an MLUI according to various embodiments may contain any kind of linguistic data. For example, text may be understood as containing any kind of media, including letters, characters, digits, icons, symbols, pictures, video, or, other types of media. According to this understanding the concept "linguistic" refers to the notion that the resulting interaction can be considered as a linguistic interaction according to general principles of language and language use.

Some example embodiments of the present invention may include matching the linguistic inputs and the annotations. The degree of match between input and annotations may be indicative of the particular service that is considered to be the "optimal fit" (e.g., by evaluating the degree of correspondence between the constituents of the predicate with respect to actor, resource, and activity. In one embodiment, the system may indicate the amount of certainty with respect to the fit between the stated user intent and the retrieved set of services and/or functions. Optionally, the system indicates the priority or relevance of the presented services and/or functions, e.g., which are mandatory and which are optional in order to accomplish the stated ser intent.

Task-Domain Model

In some embodiments, the model used in the MLUI includes a semantic layer and pragmatic layer. The model is semantic because it entails entities and semantic associations among the entities which can be characterized using semantic principles. For example, in typical semantic models, which can be characterized as ontologies, a frequent distinction is between concepts which pertain to living beings or to things. Living beings can be further differentiated into human beings and animals, and so on. Similarly, semantic associations can be classified into, for example, temporal, causal, or probabilistic associations.

In order to understand the pragmatic character of a model, which is also semantic in principle, it is easiest is to define a pragmatic layer on top of the semantic layer of a model. In the business context, typically people perform various activities (e.g., using physical or virtual objects). Thus, in terms of a pragmatic meta model, the following pragmatic syntax applies: "Actor" "perform(s) activity" "with Object". This can be stated as a semantic model, with the entities "Actor" and "Object" being associated by "perform(s) activity". However, applying this pragmatic meta model to the semantic layer of a model means that now the semantic entities are endowed with pragmatic meaning. Probably the easiest illustration is to assume that the pragmatic layer is applied dynamically to the semantic layer. Given a number of roles in semantic terms which are typical in a business domain (e.g., a vendor, a buyer, or a financial specialist) the semantic aspect of their respective activities may be invariant in view of a given ontology (e.g., "the vendor offers goods", the vendor provides quotes", "the buyer requests a budget"). However, during the actual course of computer-mediated interaction, the "pragmatic" aspects of these roles may change dynamically: "Actor requests something", "Actor replies to inquiry", "Actor offers something", etc. Accordingly, embodiments of the present invention may include a model where, during a particular course of interaction, the professional role (e.g., "vendor") may state invariant (constant) whereas the current "activity" role (e.g., "requester", "provider") may change dynamically as determined by the linguistically expressed user intent. In a purely semantic model, a role may be static, but a semantic and pragmatic model captures changing activity (actions) with the static role. In a Prolog implementation of a model, such relations between predicates which pertain to pragmatic aspects and predicates which are indicative of "semantic" aspects are either expressed using hybrid predicates or linked by way of inferences, for example.

Based on the above example, when a system receives a statement of the user intent it may interpret it in light of both its semantic and its pragmatic (dynamic) meaning. With respect to semantic interpretation, the system may receive, for example, the statement "purchase a nail" and infer that nail is an item which can be purchased only in various batches (and not as a single purchase item) or, that nails are items which may be internally on stock and need not be purchased for an external vendor. When it gets to pragmatic interpretation, for example, when a user states "trip approval request," it may not be sufficient to infer what this statement is semantically about (e.g., that a trip is associated with trip costs or that it has starting and ending date as this would be inferred from a semantics-only model). Rather, the system may infer who the actor actually is and how this intent might fit into an actual "course" concerning actors' interactions with trip approvals. Specifically, the following pragmatic interpretations of the user statement could be triggered: the user plans to submit a trip request for approval, the user wants to identify the person responsible for approving trip requests, the user wants to inspect the status of an already submitted trip request with respect to its approval, etc. Thus, the system (e.g., an inference engine) may take into account how the person who expresses their intent actually is involved in the (pragmatic) course of the activity they are (semantically) referring to. Based on both the semantic and pragmatic interpretation of statements of user intent, the inference engine retrieves services and/or functions which carry metadata and/or annotations, short "self-explanations" which best resemble the stated user intent.

This metadata can be incrementally created by observing and learning from user interactions. The metadata may accrue as logging user interactions results in building up increasingly more connections between actual user input, retrievals of service/function recommendations, and user selections (e.g., building an empirical tie). Given a specific statement of user intent, and the subsequent selection of a service and/or function, the system may not only strengthen an empirical tie between the input and service, but actually add the user statement to the metadata of the respective services and/or functions, thus making incremental use of user-generated annotations. A more explicit way of generating metadata for the repository of services and/or functions would be to elicit descriptions from users which can be modeled according to a language of business.

A language of business not only contains assertions in semantic terms (e.g., "a consumer orders a purchase item"), but also in pragmatic terms (e.g., "for a shipment to be initiated, it needs to contain the item which was ordered by the customer"). Moreover, the language of business is meant to follow the following pragmatic form "Actor performs activity in a context" with context representing concepts such as domain/situation/setting/place/scenario, etc. This form can bear a number of variations and be extensible. For example, it may contain indications of the results or outcomes of a specific task performance or activity. Alternatively, a language of business may contain indications concerning the preconditions which need to be fulfilled in order to initiate the actual task. Or, it may make references to the modalities or circumstances of the task performance (e.g., in which climate or during which season this activity is carried out).

Finally, concerning the relationship between applying semantic and pragmatic inferences, respectively, during a concrete user interaction, the following assumption may be made: given a specific expression of user intent, the type of recommended service and/or function may remain more or less invariant while varying mostly with respect to the semantics. As an example, assume that the user wants to retrieve several pieces of information with respect to an object (inspecting an object). In such a case, initially the user will indicate what object they want to inspect. This intent will be kept invariant and the user will only need to indicate which aspects or attributes they want to get information on. Specifically, the user may want to learn about the rental car that has been reserved for them. Upon identifying the particular car (instance), the user may continue the interaction with expressions such as "average consumption?", "current tank capacity?", "maximum number of passengers?", "convertible?" etc. Here, the pragmatic form, as resulting from the intent, remains constant, but will vary with respect to the—semantic—"content details" which are subjected to users' actions.

In one example implementation, users enter their task-related intent by means of a linguistic statement by inserting it into an input channel (e.g., a text input field for receiving words, or, a speech input interface including a microphone), or, by arranging linguistic elements on the screen (e.g., creating a sentence by selecting available text tags in the needed sequence). As described above, the system accepts user input, parses the input, and maps (e.g., interprets) the input according to a predefined domain-task-model.

Example Implementation of Processes

The following simplified interaction is an example of a process embodying aspects of the present invention. Building on an example above, a user natural language user statement may be as follows: "I want to buy an iPad". The statement may be parsed and mapped to a declarative programming language (a formal representation), such as Prolog, as follows: "buy(user(Joe),computer(iPad))". The input may be interpreted with respect to the following domain-task model also implemented in a declarative programming language.

```
Purchasing (user, purchase_item)
  Purchase_item (computer).
    User (buyer)
    Purchase_item (iPad)
  Approving (purchase_item).
    Manager (approving)
    Manager (rejecting)
```

The input words are mapped to actors/actions/objects—e.g., user (userID)/buy/iPad. A dictionary may be used to translate input words to model constructs, such as "iPad"="computer" or "buy"="purchasing", for example. The domain model may comprise process information for executing the action. For example, the model above indicates the purchase needs to be approved by a manager—(e.g., approving (purchase_item) and Manager(approving). Accordingly, the system may access a tool or other software resource for approving purchase items. The tool may be accessed based on application of the input to the model along with a tool annotation expressed in the same formal representation (e.g., actor(manager), action(approve), object(computer)).

Another example domain-task-model is "Trip Planning." In this example, the model comprises statements in programming language notation which pertain to actors (roles), activities (actions), objects (resources). Specifically, the following model is represented in Prolog notation. Thus, the following model is a declarative programming approach, as compared to a functional programming approach, which includes both semantic and pragmatic layers (or aspects). The following model establishes relationships between input actor/activity/object and other actors/activities/objects and includes process information for a Trip Planning process:

```
entails(element_class,relation).
entails(element_class,actor).
entails(element_class,activity).
entails(element_class,resource).
entails(assoc_class,affects).
entails(assoc_class,executed_before).
entails(assoc_class,manipulates).
entails(assoc_class,expects_from).
entails(assoc_class,carries_out).
entails(assoc_class,defined_through).
entails(assoc_class,belongs_to).
entails(assoc_class,is_used_by).
entails(assoc_class,relates_to).
entails(element_class,actor).
entails(element_class,activity).
entails(element_class,resource).
relates_to(resource,resource).
relates_to(activity,activity).
relates_to(precedes).
relates_to(follows).
precedes(planning,submitting).
precedes(submitting,approving).
precedes(submitting,requesting_change).
precedes(reviewing,approving).
precedes(approving,booking).
defined_through(actor,resource).
expects_from(actor,actor).
is_used_by(resource,activity).
belongs_to(resource,actor).
succeeds_if(planning,creating,changing).
activity(requesting_change).
activity(planning).
activity(creating).
activity(changing).
activity(creating).
activity(changing).
activity(submitting).
activity(booking).
activity(approving).
activity(reviewing).
actor(traveler).
actor(reviewer).
actor(approver).
resource(trip).
resource(itinerary).
resource(accommodation).
resource(travel).
resource(mode_of_transportation).
resource(itinerary_cost).
resource(accommodation_cost).
resource(location).
resource(duration).
resource(departure).
resource(arrival).
resource(travel_cost).
resource(origin).
resource(destination).
resource(airplane).
resource(car).
resource(ferry).
resource(train).
resource(shuttle).
performs(actor,activity).
performs(traveler,planning).
performs(traveler,booking).
performs(traveler,submitting).
performs(reviewer,requesting_change).
performs(reviewer,reviewing).
performs(approver,approving).
affects(activity,resource).
affects(activity,actor).
affects(requesting_change,traveler).
affects(submitting,reviewer).
affects(planning,trip).
affects(booking,trip).
affects(approving,trip).
affects(reviewing,trip).
affects(creating,itinerary).
affects(changing,itinerary).
assoc(duration,departure).
assoc(duration,arrival).
assoc(itinerary_cost,accommodation_cost).
assoc(itinerary_cost,travel_cost).
assoc(destination,location).
assoc(travel,mode_of_transportation).
assoc(travel,accommodation).
contains(planning,changing).
contains(planning,creating).
contains(actor,traveler).
contains(actor,reviewer).
contains(reviewer,approver).
contains(trip,itinerary).
contains(trip,accommodation).
contains(trip,travel).
contains(trip,mode_of_transportation).
contains(itinerary,itinerary_cost).
contains(accommodation,accommodation_cost).
contains(accommodation,location).
contains(travel,duration).
contains(travel,travel_cost).
contains(travel,origin).
contains(travel,destination).
contains(mode_of_transportation,airplane).
contains(mode_of_transportation,car).
contains(mode_of_transportation,ferry).
contains(mode_of_transportation,train).
contains(mode_of_transportation,shuttle).
```

Example Hardware

Figure 4:
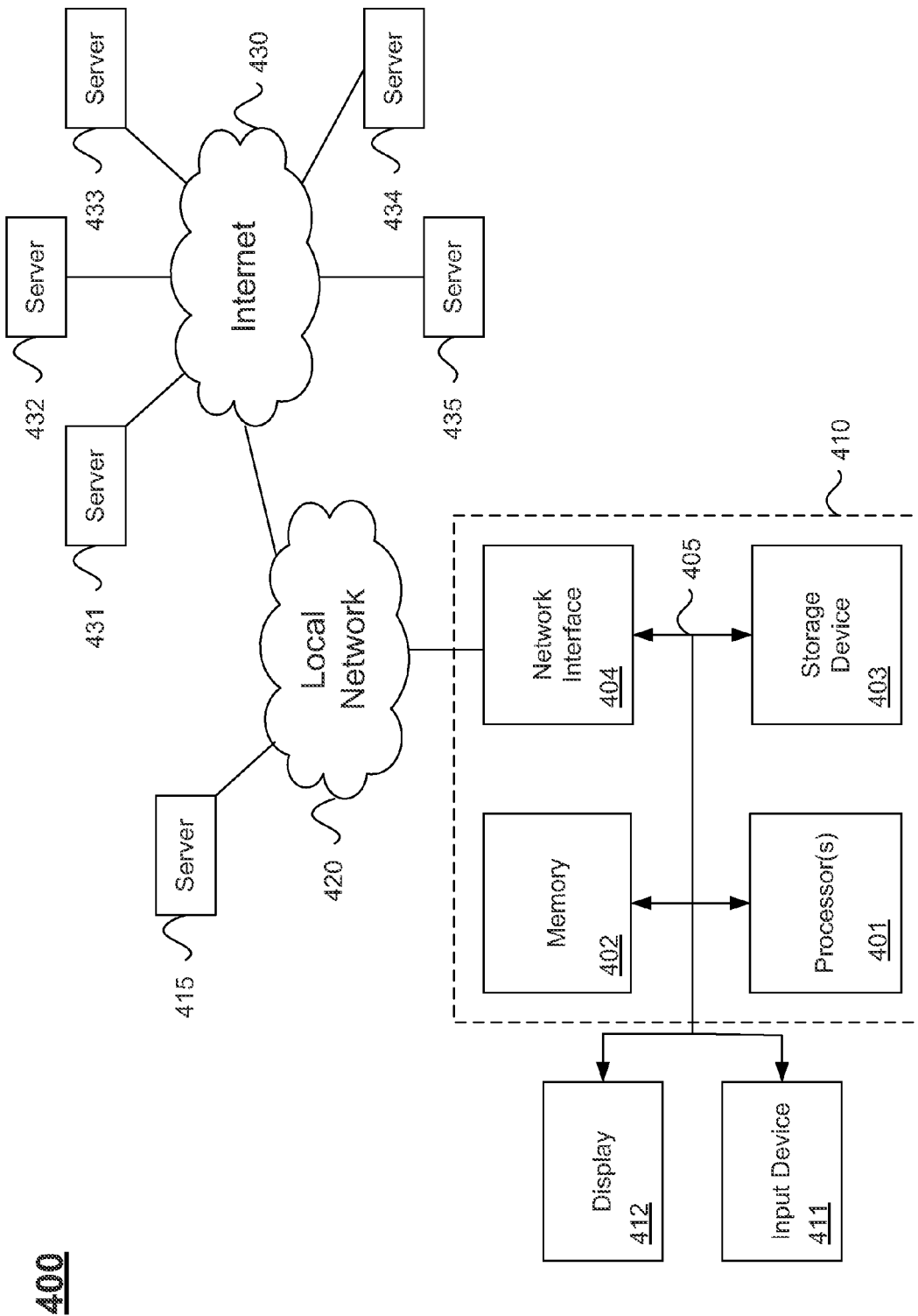
FIG. 4 illustrates hardware of a special purpose computing machine configured with a process according to embodiments of the present invention.

FIG. 4 illustrates hardware of a special purpose computing machine configured with a process according to embodiments of the present invention. An example computer system 410 is illustrated in FIG. 4. Computer system 410 includes a bus 405 or other communication mechanism for communicating information, and a processor 401 coupled with bus 405 for processing information. Computer system 410 also includes a memory 402 coupled to bus 405 for storing information and instructions to be executed by processor 401, including information and instructions for performing the techniques described above, for example. This memory may also be used for storing variables or other intermediate information during execution of instructions to be executed by processor 401. Possible implementations of this memory may be, but are not limited to, random access memory (RAM), read only memory (ROM), or both. A storage device 403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 403 may include source code, binary code, or software files for performing the techniques above, for example. Storage device and memory are both examples of computer readable mediums.

Computer system 410 may be coupled via bus 405 to a display 412, such as a cathode ray tube (CRT) or liquid crystal display (LCD), for displaying information to a computer user. An input device 411 such as a keyboard and/or mouse is coupled to bus 405 for communicating information and command selections from the user to processor 401. The combination of these components allows the user to communicate with the system. In some systems, bus 405 may be divided into multiple specialized buses.

Computer system 410 also includes a network interface 404 coupled with bus 405. Network interface 404 may provide two-way data communication between computer system 410 and the local network 420. The network interface 404 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 404 sends and receives electrical, electromagnetic, or optical signals that carry digital data streams representing various types of information.

Computer system 410 can send and receive information, including messages or other interface actions, through the network interface 404 across a local network 420, an Intranet, or the Internet 430. For a local network, computer system 410 may communicate with a plurality of other computer machines, such as server 415. Accordingly, computer system 410 and server computer systems represented by server 415 may form a cloud computing network, which may be programmed with processes described herein. In the Internet example, software components or services may reside on multiple different computer systems 410 or servers 431-435 across the network. The processes described above may be implemented on one or more servers, for example. A server 431 may transmit actions or messages from one component, through Internet 430, local network 420, and network interface 404 to a component on computer system 410. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   receiving, on a computer system, an input from a user, the input comprising one or more linguistic inputs;
   parsing the one or more linguistic inputs on the computer system;
   mapping, on the computer system, the one or more linguistic inputs to a formal representation used by a model, wherein the formal representation comprises actors, activities, and objects, wherein the one or more linguistic inputs are mapped to a first actor, a first activity, and a first object;
   storing information in a datastore on the computer system, the information corresponding to a plurality of software resources, wherein the plurality of software resources have associated annotations, the annotations comprising first elements of the formal representation used by the model;
   applying, on the computer system, the formal representation of the linguistic inputs against the model, wherein the model specifies relationships between elements of the formal representation and defines process information; and
   accessing software resources on the computer system based on the formal representation of the linguistic inputs, the relationships and process information in said model, and the annotations.

2. The method of claim 1, wherein the model comprising a plurality of actors including the first actor, a plurality of activities including the first activity, and a plurality of objects including the first object, wherein the model specifies relationships between the actors, activities, and objects and defines process information for executing the first activity.

3. The method of claim 1 further comprising determining that the one or more linguistic inputs do not include at least one of the first actor, the first activity, or the first object, the method further comprising invoking a resolution dialog to obtain first actor, first activity, or first object not included in said one or more linguistic inputs.

4. The method of claim 1 wherein mapping comprises accessing an electronic dictionary, wherein the dictionary maps one of said linguistic inputs to said first actor, said first activity, or said first object.

5. The method of claim 1 wherein the annotations comprise an actor, an activity, and an object.

6. The method of claim 1 wherein the model is implemented in declarative programming language statements.

7. A non-transitory computer readable storage medium embodying a computer program for performing a method, said method comprising:
   receiving, on a computer system, an input from a user, the input comprising one or more linguistic inputs;
   parsing the one or more linguistic inputs on the computer system;
   mapping, on the computer system, the one or more linguistic inputs to a formal representation used by a model, wherein the formal representation comprises actors, activities, and objects, wherein the one or more linguistic inputs are mapped to a first actor, a first activity, and a first object;
   applying, on the computer system, the formal representation against the model, the model comprising said formal representation, wherein the model specifies relationships between the elements of the formal representation and defines process information; and accessing software resources on the computer system based on the formal representation of the user input and the relationships and process information in said model.

8. The non-transitory computer readable storage medium of claim 7, the model comprising a plurality of actors including the first actor, a plurality of activities including the first activity, and a plurality of objects including the first object, wherein the model specifies relationships between the actors, activities, and objects and defines process information for executing the first activity.

9. The non-transitory computer readable storage medium of claim 7 further comprising determining that the one or more linguistic inputs do not include at least one of the first actor, the first activity, or the first object, the method further comprising invoking a resolution dialog to obtain first actor, first activity, or first object not included in said one or more linguistic inputs.

10. The non-transitory computer readable storage medium of claim 7 wherein mapping comprises accessing an electronic dictionary, wherein the dictionary maps one of said linguistic inputs to said first actor, said first activity, or said first object.

11. The non-transitory computer readable storage medium of claim 7 wherein the annotations comprise an actor, an activity, and an object.

12. A system comprising:
one or more processors;
memory; and
one or more executable software components, executable by said processors to:
receive an input from a user, the input comprising one or more linguistic inputs;
parse the one or more linguistic inputs;
map the one or more linguistic inputs to a formal representation used by a model, wherein the formal representation comprises actors, activities, and objects, wherein the one or more linguistic inputs are mapped to a first actor, a first activity, and a first object;
apply the formal representation against the model, the model comprising said formal representation, wherein the model specifies relationships between the elements of the formal representation and defines process information; and
access software resources based on the formal representation of the user input and the relationships and process information in said model.

13. The system of claim 12, the model comprising a plurality of actors including the first actor, a plurality of activities including the first activity, and a plurality of objects including the first object, wherein the model specifies relationships between the actors, activities, and objects and defines process information for executing the first activity.

14. The system of claim 12 further comprising determining that the one or more linguistic inputs do not include at least one of the first actor, the first activity, or the first object, the method further comprising invoking a resolution dialog to obtain first actor, first activity, or first object not included in said one or more linguistic inputs.

15. The system of claim 12 wherein mapping comprises accessing an electronic dictionary, wherein the dictionary maps one of said linguistic inputs to said first actor, said first activity, or said first object.

16. The system of claim 12 wherein the annotations comprise an actor, an activity, and an object.

17. The system of claim 12 wherein the model is implemented in declarative programming language statements.

* * * * *